United States Patent
Brodowsky

[11] Patent Number: 6,158,170
[45] Date of Patent: Dec. 12, 2000

[54] MOVABLE-WINDOW SAFETY DEVICE

[75] Inventor: Thomas Brodowsky, Toenisvorst, Germany

[73] Assignee: Draftex Industries Limited, Edinburgh, United Kingdom

[21] Appl. No.: 08/945,876

[22] PCT Filed: Apr. 10, 1996

[86] PCT No.: PCT/GB96/00880

§ 371 Date: Nov. 27, 1998

§ 102(e) Date: Nov. 27, 1998

[87] PCT Pub. No.: WO96/35035

PCT Pub. Date: Nov. 7, 1996

(Under 37 CFR 1.47)

[30] Foreign Application Priority Data

May 5, 1995 [DE] Germany ................................ 9509184

[51] Int. Cl.[7] ..................................................... E05F 15/02
[52] U.S. Cl. .................................................................. 49/28
[58] Field of Search .................................. 49/26, 27, 28, 49/440, 441, 475.1, 489.1, 495.1

[56] References Cited

U.S. PATENT DOCUMENTS 3,465,476  9/1969  Rayner et al. ............................. 49/28
5,621,290  4/1997  Heller et al. ........................... 49/28 X

FOREIGN PATENT DOCUMENTS 0 300 550  1/1989  European Pat. Off. .

*Primary Examiner*—Jerry Redman
*Attorney, Agent, or Firm*—Leydig, Voit & Mayer, Ltd.

[57] ABSTRACT

A movable-window safety device for arresting upward movement of a power-driven window glass in a motor vehicle body in the event of obstruction in the window opening comprises a resilient channel for receiving the window glass and which is mounted in a rigid window frame. The base of the resilient channel comprises an electrical detecting member housed in a hollow chamber. The side walls of the resilient channel extend proud of the sides of the rigid window frame and carry curved-over outer lips and inner lips. An obstruction in the window opening is carried upwardly by the window glass and applies a force to one or other of the side walls of the resilient channel, according to whether the obstruction extends inwardly or outwardly of the window opening. The resultant force is applied to the detecting member. The detecting member may be part of a capacitor in the tuned circuit of an oscillator whose frequency correspondingly varies in response to the resultant movement of the detecting member and is detected to arrest the window glass. Instead, it could be a member whose electrical resistance is changed by the applied force and is detected by an appropriate detecting circuit to arrest the window glass. An additional hollow chamber is provided in the base of the channel to increase its resilience.

11 Claims, 3 Drawing Sheets

MOVABLE-WINDOW SAFETY DEVICE

BACKGROUND OF THE INVENTION

1. Field of the Invention

The invention relates to a movable-window safety device for detecting the presence of an obstruction in an opening closable by a power-driven window glass, comprising resilient material forming a resilient channel for mounting in a rigid window frame and for receiving an edge of the moving window glass when so mounted, the resilient channel being dimensioned so that its two side walls have extensions beyond the rigid window frame whereby an obstruction entering the window opening from either side thereof is moved into contact with a respective one of the extensions by the moving window glass and applies a force through the extension to the respective side wall and directed towards the base of the resilient channel, electrical detecting means mounted within and extending along the rigid window frame so as to be acted on by the said force and to produce a corresponding electrical signal, the width of the electrical detecting means extending substantially across the width of the resilient channel so as to respond to the said force applied through either of the extensions, and control means responsive to the electrical signal to arrest power-driven movement of the window glass.

2. Description of the Related Art

One such device is shown in FR-A-1 549 640 (corresponding to GB-A-1 98 439). In one form of this known device, the resilient channel is mounted within an additional rigid channel made of electrically conductive material. The combination of this rigid channel and the resilient channel is mounted within the rigid window frame by means of rubber buffers which allow the combination to be moved against the resilience of the rubber buffers by the force produced by an obstruction so that the rigid channel moves into contact with another conductor also resiliently supported from the window frame. Such an arrangement comprises a multitude of separate parts and, accordingly, its assembly would be difficult. In another form of this known device, the outside of the base of the resilient channel carries an electrical conductor which is moved by the force caused by an obstruction into contact with the rigid window frame. In this case, the conductor cannot be completely sealed from the surrounding air because the resilient channel must be sufficiently free to slide within the rigid window frame.

EP-A-0 648 628 describes movable-window safety devices in which a conductor forming one plate of a capacitor in an electrical oscillating circuit is embedded in part of a window channel, or a part associated with a window channel, so as to detect the presence of an obstruction in the window opening by non-contact means—the obstruction altering the frequency of the oscillator. However, with such non-contact methods it is difficult to ensure reliable operation over a long period of time and in a variety of different ambient conditions. In another form described, the conductor is embedded in a lip extending externally from a window channel so as to be physically moved by direct contact between the lip and an obstruction on one side of the window opening. However, such an arrangement is not effective in detecting obstructions approaching from either side of the window opening.

SUMMARY OF THE INVENTION

According to the invention, there is provided a movable-window safety device for detecting a presence of an obstruction in a window opening closable by a power-driven window glass, comprising resilient material forming a resilient channel for mounting in a rigid window frame and for receiving an edge of the window glass when so mounted, the resilient channel having a base, a mouth and two side walls and being dimensioned so that the two side walls have extensions beyond the rigid window frame whereby an obstruction entering the window opening from either side thereof is moved into contact with a respective one of the extensions by the window glass when the window glass is moving and applies a force through said one extension to the respective side wall and directed towards the base of the resilient channel, electrical detecting means mounted within and extending along the rigid window frame so as to be acted on by the force and to produce a corresponding electrical signal, the width of the electrical detecting means extending substantially across the width of the resilient channel so as to respond to the force applied through either of the extensions, control means responsive to the electrical signal to arrest power-driven movement of the window glass, the electrical detecting means being mounted within a resilient enclosure in the base of the resilient channel, and wherein the resilient material forming the base of the channel is provided with at least one hollow chamber to increase its resilience, this hollow chamber being additional to the resilient enclosure in which is mounted the electrical detecting means.

In this way, therefore, the electrical detecting means is sealingly incorporated within the resilient channel, and it and the resilient channel can be assembled into the window frame as a unit.

BRIEF DESCRIPTION OF THE DRAWINGS

Movable-window safety devices embodying the invention will now be described, by way of example only, with reference to the accompanying diagrammatic drawings in which.

DESCRIPTION OF THE PREFERRED EMBODIMENTS

Figure 1:
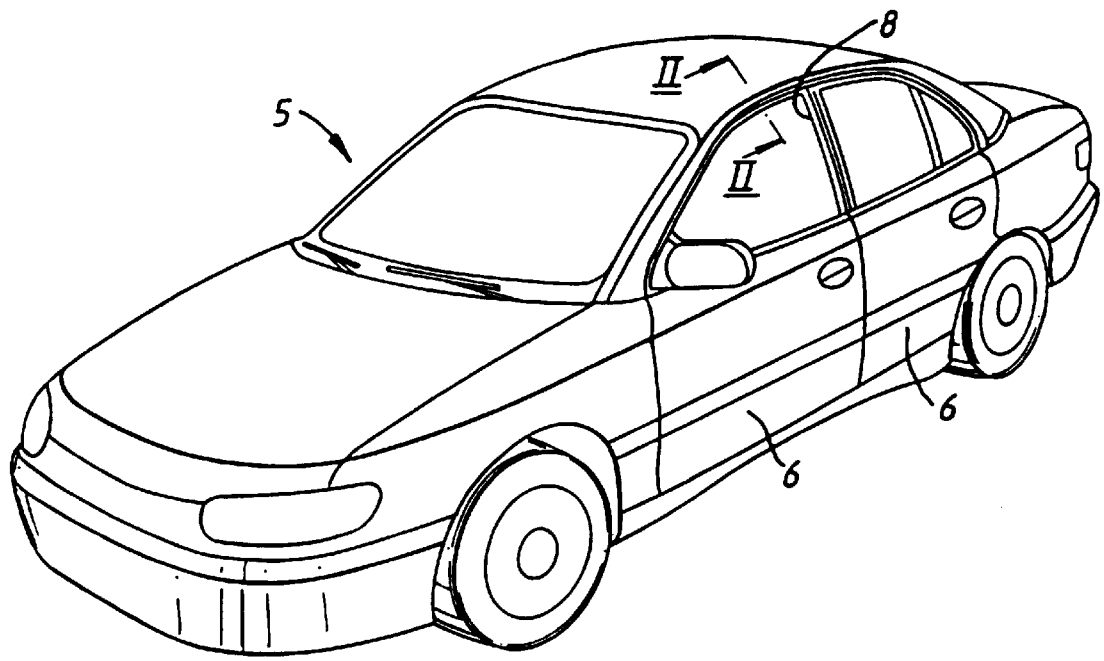
FIG. 1 is a perspective view of a motor vehicle showing where the safety devices can be mounted.

FIG. 1 shows a motor vehicle 5. Each door 6 carries a window frame 8 in which a window glass is upwardly and downwardly slidable, the window glass being raised and lowered by means of an electric motor mounted in the lower part of the door. For safety reasons, it is necessary to arrange for the upward movement of the window glass to be stopped automatically if an obstruction is detected in the window opening.

Figure 2:
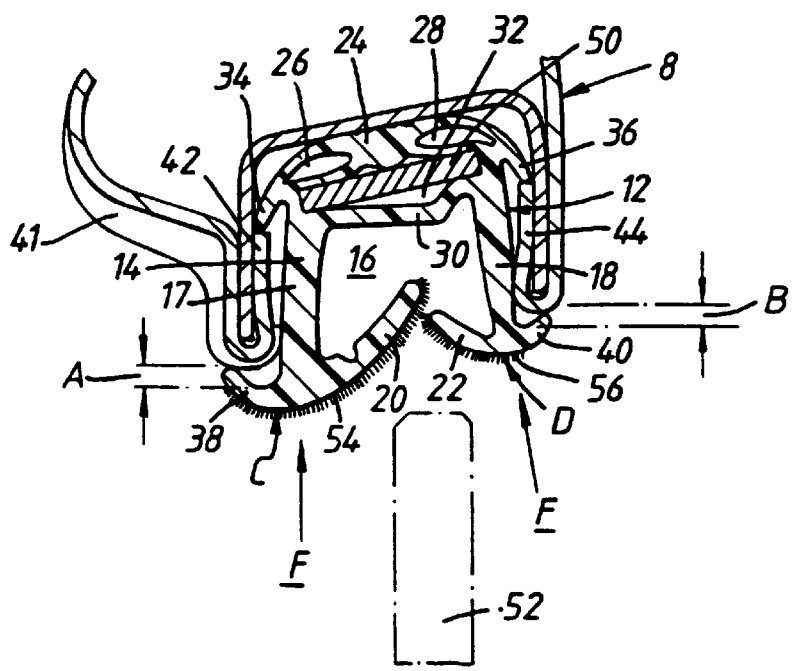
FIG. 2 is a cross-section on the line II—II of FIG. 1, showing one of the safety devices mounted in position and in use.
Figure 3:
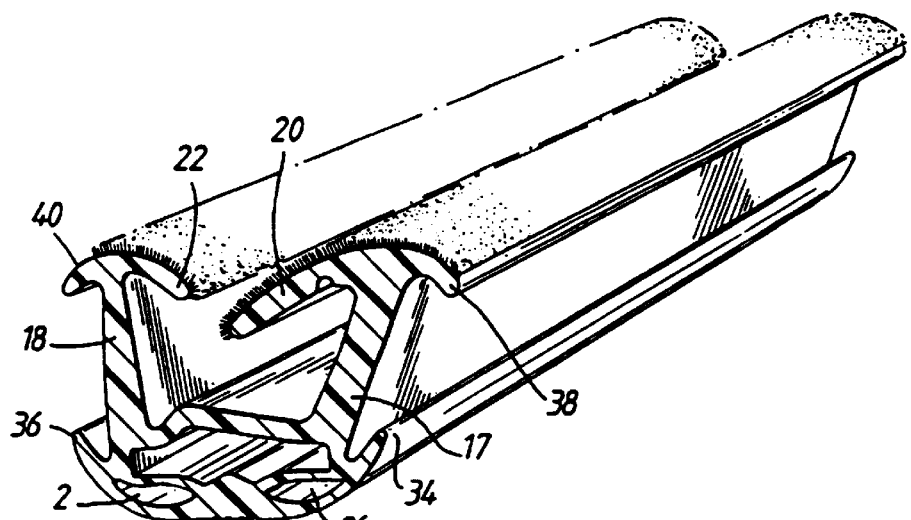
FIG. 3 is a perspective cross-sectional view, corresponding to FIG. 2, of one of the safety devices before completion of its manufacture.

FIG. 2 shows a safety device embodying the invention which is used, in a manner to be explained, for stopping upward movement of the window glass in the event of detection of such an obstruction.

The safety device 12 is in the form of a window guiding and sealing strip. The strip 12 comprises generally channel-shaped extruded plastics or rubber material 14 defining a channel 16 having walls 17 and 18. The strip 12 is mounted in the rigid window frame 8 mounted in the upper part of the door 6.

The material 14 defines integral lips 20 and 22 which together bridge across the mouth of the channel 16. The base 24 of the channel is relatively thick and defines two longitudinally extending hollow chambers 26 and 28. In addition, a web 30 extends across the base of the channel and defines with it an enlarged chamber 32.

The sides of the base 24 are integrally extended to provide lips 34 and 36.

The distal ends of the walls 17,18 of the channel are provided with outwardly extending lips 38 and 40.

The strip 12 is sized to fit within the U-shape of the window frame 8 and is arranged to be a resilient push-fit. When placed in position, its lips 34 and 36 expand outwardly behind shoulders formed where the edges of the inner and outer door panels 42 and 44 are bent over, and welded, to produce the window frame 8. In this way, the strip 12 is held firmly in position.

The walls 17,18 of the strip 12 are sized so that their distal edges extend outwardly of the frame 8, the outer lips 38 and 40 curving over to engage over the edges of the window frame. In this way, gaps A and B are formed under the lips 38 and 40 for a purpose to be described. As shown in FIG. 2, the lip 38 may clamp part of the interior trim 41 to the edge of the window frame.

Inside the chamber 32, a detecting member 50 is positioned. The member 50 is inserted into the chamber 32 endwise during manufacture.

The member 50 may take several different forms, as will be described in more detail below. In one form, it comprises an electrical conductor. In another form, it comprises material whose electrical resistance changes in response to applied force or pressure.

The safety device or strip 12 is mounted along the upper part of the window frame 8 as shown in FIG. 1 and may also extend down the "A" pillar of the vehicle. Along the "B" pillar of the vehicle, a normal window channel may be provided.

FIG. 2 shows the window glass 52. During normal unobstructed movement, it is raised by an electric motor under control of an occupant of the vehicle. As it completes its upward movement, it enters the channel 16, and, in so doing, is sealingly contacted on each side by the lips 20 and 22. Advantageously, these lips are covered with flock 54 or other suitable low friction material.

If an obstruction is present within the window opening, however, such as a human hand, this will be carried upwardly by the rising window glass 52 and will make contact with the outer face C or D of the window channel, depending on whether the obstruction is presented from inside or outside of the vehicle (or may make contact with both faces C and D). As the obstruction continues to be driven upwardly by the rising window glass 52, a force will be applied to the face C and/or the face D in the direction of the arrows F. This force will be transmitted to the detecting member 50 by the corresponding wall or walls 17,18 of the strip 12, this process being aided by the gaps A and B and by the chambers 26 and 28 in the base 24 of the strip which provide added compressibility for the base.

In a manner to be described, the member 50 detects the presence of the obstruction and abruptly stops upward movement of the window glass. Advantageously, the upward movement of the window glass is not only stopped but reversed so that the obstruction can be removed.

Figure 4:
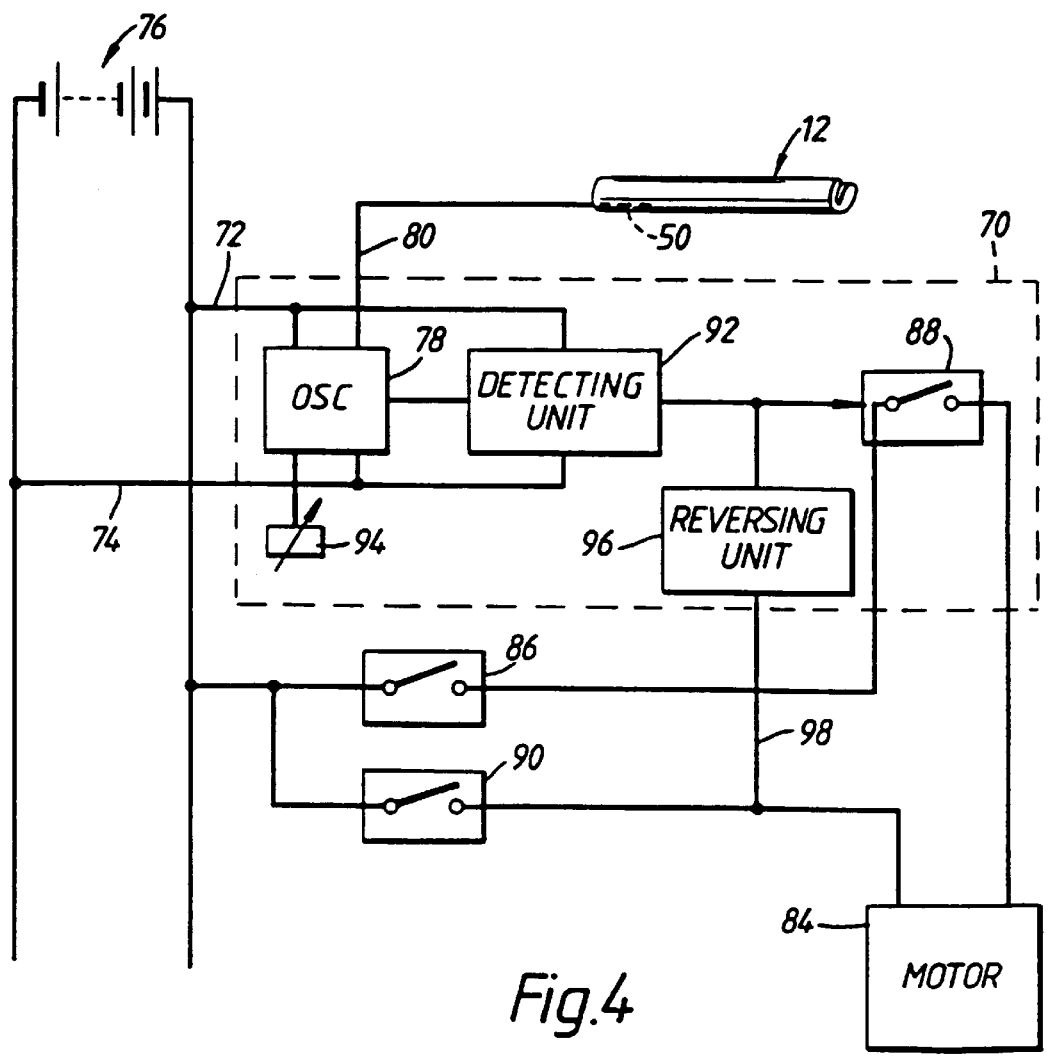
FIG. 4 is a circuit diagram of one form of circuit which can be used in a system in which the safety devices may be used.

FIG. 4 shows one form of circuit which may be used for driving the window glass 52 up and down and for responding to detection of an obstruction by the detecting member 50. In this case, it is assumed that the detecting member 50 comprises an electrical conductor.

As shown in FIG. 4, the circuit comprises a control unit 70 which is supplied with electrical power on lines 72 and 74 from the vehicle's battery 76. The control unit 70 includes an oscillator 78 having a tuned circuit, part of which is formed by a capacitor of which the detecting member 50 of FIG. 2 forms one plate, the adjacent window frame 8 forming the other plate. A connection 80 (FIG. 4) is therefore made from the oscillator to the detecting member 50. It will be understood that the extruded plastics or rubber material 14 electrically insulates the detecting member 50 from the vehicle bodywork.

FIG. 4 also shows the circuit for energising the electrical motor 84 for raising and lowering the window glass 52, this motor being positioned in the lower part of the door 6 (FIG. 1). The motor 84 is energised by means of an "up" switch 86 which is positioned for use by the driver or passenger. When switch 86 is closed, motor 84 is electrically energised through a further switch 88 forming part of the control unit 70. Switch 88 is normally closed. Closure of switch 86 therefore energises motor 84, and the window glass 52 thus begins to move upwardly.

A second switch 90 is provided for the driver or passenger, and is used for causing the motor 84 to lower the window glass.

In operation, the presence of an obstruction in the window opening causes a force F to be applied to one or both side walls 17,18 of the strip 12 in the manner explained. This results in corresponding movement of the detecting member 50. This causes a consequent and significant change in the capacitance in the tuned circuit of the oscillator 78. An abrupt and significant change in the oscillator frequency will therefore take place and this will be detected by a detecting unit 92 (FIG. 4) in the control unit 70. Detecting unit 92 produces an output which opens switch 88, thus immediately stopping the motor 84 and the rising window glass 52. In addition, the control unit 70 may incorporate a reversing unit 96 which responds to the output from the detector 92 by providing an output on a line 98 which reverses the motor 84, so as to cause it to lower the window.

A control 94 may be provided for adjusting the oscillator 78.

When the window glass 52 rises in an unobstructed manner, it will of course eventually reach the base of the channel 16. The limit of its upward movement will be detected by a conventional limit switch (not shown) which will switch off the motor 84 in the normal way. In its final upward position, the window glass will apply pressure to the base of the channel, thus moving and/or applying pressure to the detecting member so. However, the normal limit switch can be used to prevent the control unit 70 (FIG. 4) from responding to such movement of or pressure on the detecting member 50.

Figure 5:
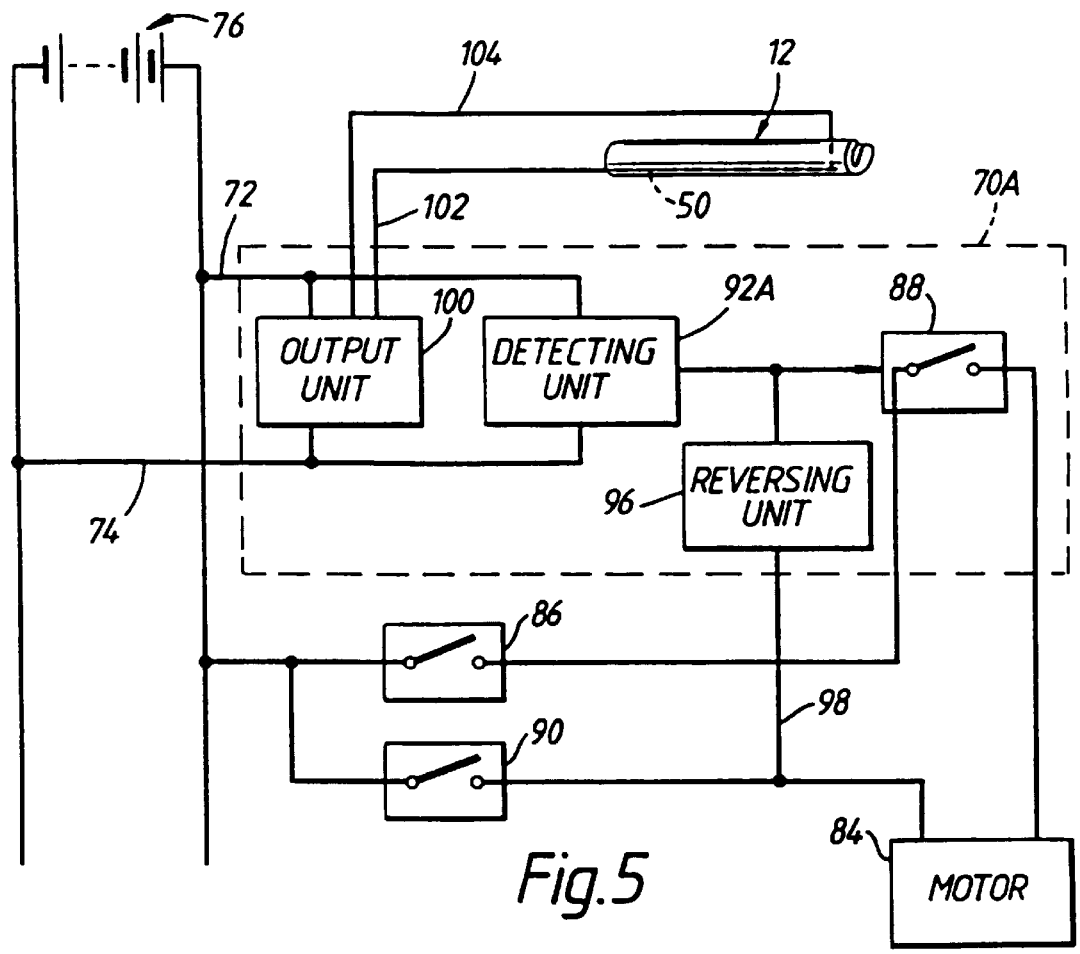
FIG. 5 corresponds to FIG. 4 but shows a modified form of the circuit diagram.

In another embodiment, detecting member 50 is not a simple electrical conductor but is instead made of material whose electrical resistance changes with applied force or pressure. FIG. 5 shows a modified version of the circuit of FIG. 4 which may be used when the detecting member 50 has this form. Items in FIG. 5 corresponding to those in FIG. 4 are similarly referenced.

As shown, the circuit of FIG. 5 incorporates a control unit 70A. This includes an output unit 100 which is energised by the battery 76 and applies an appropriate electrical potential across the member 50 (FIG. 2) by output lines 102 and 104. A detecting unit 92A is connected to lines 102 and 104 and detects any change in electrical resistance of the member 50, caused by applied force (that is, by the force F resulting from the presence of any obstruction, as explained above in connection with FIG. 2). In the event of detection of such change in resistance, the detecting unit 92A opens switch 88 which thus abruptly stops motor 84 in the manner already explained. Again, the control unit 70A may be provided with a reversing unit 96.

It will be appreciated that the circuits shown in FIGS. 4 and 5 are merely examples of many different forms of circuit which can be used for responding to the output of the detecting member 50.

Figure 6:
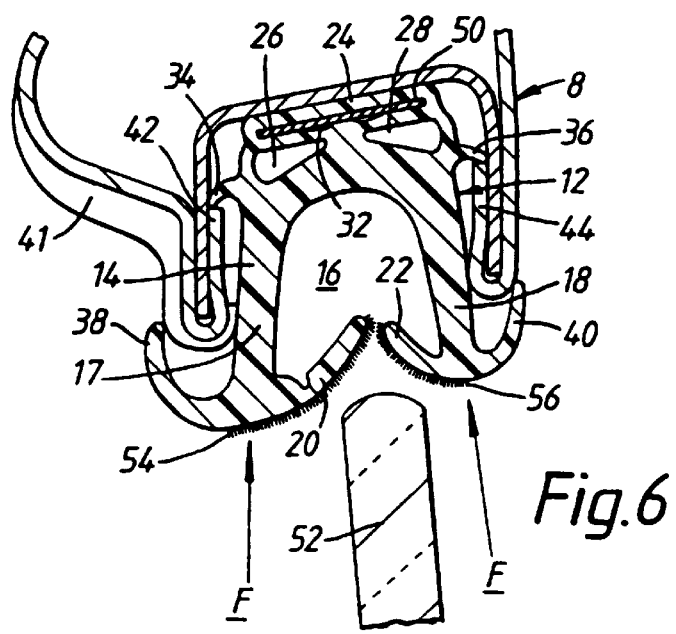
FIG. 6 corresponds to FIG. 2 but shows a modified form of the device thereof.

The arrangement of FIG. 6 (in which parts corresponding to those in FIG. 2 are similarly referenced) differs from that in FIG. 2 in that the chambers 26,28 are provided on the opposite side of the member 50 as compared with FIG. 2. In addition, member 50 is a closer fit in its enclosure 32 than in FIG. 2.

In both the arrangements (FIGS. 2 and 6), different parts of the extruded plastics or rubber material 14 may be given different hardnesses to suit their respective purposes The material of the base of the channel may be relatively soft, for example.

The devices illustrated is advantageous in that it can detect an obstruction which enters the window opening either from the inside or the outside of the vehicle.

What is claimed is:

1. A movable-window safety device for detecting a presence of an obstruction in a window opening closable by a power-driven window glass, comprising resilient material forming a resilient channel for mounting in a rigid window frame and for receiving an edge of the window glass when so mounted, the resilient channel having a base, a mouth and two side walls and being dimensioned so that the two side walls have extensions beyond the rigid window frame whereby an obstruction entering the window opening from either side thereof is moved into contact with a respective one of the extensions by the window glass when the window glass is power-drivingly moving and applies a force through said one extension to the respective side wall and directed towards the base of the resilient channel, electrical detecting means mounted within and extending along the rigid window frame so as to be acted on by the force and to produce a corresponding electrical signal, the width of the electrical detecting means extending substantially across the width of the resilient channel so as to respond to the force applied through either of the extensions, control means responsive to the electrical signal to arrest power-driven movement of the window glass, the electrical detecting means being mounted within a resilient enclosure in the base of the resilient channel, and wherein the resilient material forming the base of the channel is provided with at least one hollow chamber to increase its resilience, this hollow chamber being additional to the resilient enclosure in which is mounted the electrical detecting means.

2. A device according to claim 1, wherein each extension is formed by the edge of the respective one of the walls of the resilient channel.

3. A device according to claim 2, wherein each edge carries an integral lip extending away from the mouth of the channel and for partially embracing an adjacent part of the window frame.

4. A device according to claim 3, wherein each edge carries an integral lip for making sealing contact with an edge of the window glass.

5. A device according to claim 1, wherein the hollow chamber is closer to the outside of the base of the channel than the electrical detecting means.

6. A device according to claim 1, wherein the hollow chamber is closer to the inside of the base of the channel than the electrical detecting means.

7. A device according to claim 1, wherein the base of the channel is formed with integral lips extending externally of the channel and outwardly from the base thereof to make locking contact with respective formations on the rigid frame.

8. A device according to claim 1, wherein the control means comprises an electrical oscillator having a tuned circuit for determining the frequency of the oscillator, and in that the detecting means comprises an electrical conductor the movement of which in response to the force affects capacitance within the tuned circuit and thus the frequency of the oscillator, the control means including means responsive to variation in the frequency of the oscillator to produce a controlled output, and means responsive to the controlled output for arresting the movement of the power-driven window glass.

9. A device according to claim 8, and including means responsive to the controlled output for reversing the power-driven window glass so as to drive it away from the resilient channel.

10. A device according to claim 1, wherein the detecting means comprises material having an electrical resistance that undergoes a variation in response to the force, and in that the control means comprises means connected to the detecting means for detecting the variation in its electrical resistance and for producing a controlled output, and means responsive to the controlled output for arresting the power-driven window glass.

11. A device according to claim 10, and including means responsive to the controlled output for reversing the power-driven window glass so as to drive it away from the resilient channel.

* * * * *

UNITED STATES PATENT AND TRADEMARK OFFICE
CERTIFICATE OF CORRECTION

PATENT NO. : 6,158,170
DATED : December 12, 2000
INVENTOR(S) : Thomas Brodowsky

It is certified that error appears in the above-identified patent and that said Letters Patent is hereby corrected as shown below:

Title page,
Item [30], Foreign Application Priority Data,
"May 5, 1995 [DE] Germany……………………………………………..9509184"
should read
Item [30], Foreign Application Priority Data,
-- May 5, 1995 [GB] Great Britain …………………………………..9509184 --

Signed and Sealed this

Eighteenth Day of June, 2002

Attest:

Attesting Officer

JAMES E. ROGAN
*Director of the United States Patent and Trademark Office*